United States Patent
Li et al.

(10) Patent No.: US 10,447,500 B2
(45) Date of Patent: Oct. 15, 2019

(54) DATA PACKET PROCESSING METHOD, HOST, AND SYSTEM

(71) Applicant: Huawei Technologies Co., Ltd., Shenzhen (CN)

(72) Inventors: Junwu Li, Beijing (CN); Si Shen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/018,861

(22) Filed: Jun. 26, 2018

(65) Prior Publication Data
US 2018/0302243 A1    Oct. 18, 2018

Related U.S. Application Data

(63) Continuation of application No. PCT/CN2016/110803, filed on Dec. 19, 2016.

(51) Int. Cl.
*H04L 12/46* (2006.01)
*G06F 9/455* (2018.01)
(Continued)

(52) U.S. Cl.
CPC .......... *H04L 12/4645* (2013.01); *G06F 9/455* (2013.01); *G06F 9/45558* (2013.01);
(Continued)

(58) Field of Classification Search
CPC .......... G06F 2009/45595; G06F 9/455; G06F 9/45558; H04L 12/4633; H04L 12/4645;
(Continued)

(56) References Cited

U.S. PATENT DOCUMENTS

2010/0290473 A1    11/2010 Enduri et al.
2013/0322335 A1*   12/2013 Smith .................... G06Q 30/01
                                                                        370/328
(Continued)

FOREIGN PATENT DOCUMENTS

CN    102067533 A    5/2011
CN    104521198 A    4/2015

OTHER PUBLICATIONS

Xiaodong, D., "Cloud Data Center SDN / NFV Application Analysis," Telecommunications Technology, China Mobile communications Research Institute, Jul. 2015, pp. 33-38.
(Continued)

*Primary Examiner* — Robert J Lopata
(74) *Attorney, Agent, or Firm* — Conley Rose, P.C.

(57) ABSTRACT

A data packet processing method includes cloud management platform sends virtual private cloud (VPC) network information of a computing instance running on a host to a network processing device, a virtual switch receives a data packet from the computing instance using a virtual port of the computing instance, and the data packet carries a network address of the computing instance and a virtual local area network (VLAN) identifier of the virtual port sending the data packet, the virtual switch sends the data packet according to the VLAN identifier, and routes the data packet to the network processing device, the network processing device determines the VPC network information of the computing instance according to the network address of the computing instance, and performs network function processing on the data packet. Therefore, a VPC network feature of a computing instance can be adjusted according to a requirement, thereby improving management efficiency.

17 Claims, 11 Drawing Sheets

(51) Int. Cl.
*H04L 12/723* (2013.01)
*H04L 12/931* (2013.01)
*H04L 29/12* (2006.01)

(52) U.S. Cl.
CPC .......... *H04L 12/4633* (2013.01); *H04L 45/50* (2013.01); *H04L 49/70* (2013.01); *G06F 2009/45595* (2013.01); *H04L 49/354* (2013.01); *H04L 61/2015* (2013.01)

(58) Field of Classification Search
CPC ....... H04L 45/50; H04L 49/354; H04L 49/70; H04L 61/2015
USPC ......................................................... 370/392
See application file for complete search history.

(56) References Cited

U.S. PATENT DOCUMENTS

| | | | | |
|---|---|---|---|---|
| 2013/0329725 A1* | 12/2013 | Nakil | .................... | H04L 45/586 370/360 |
| 2013/0332602 A1* | 12/2013 | Nakil | .................... | H04L 41/147 709/224 |
| 2014/0036675 A1 | 2/2014 | Wang et al. | | |
| 2014/0192804 A1* | 7/2014 | Ghanwani | ............... | H04L 49/70 370/390 |
| 2015/0244617 A1* | 8/2015 | Nakil | .................. | G06F 9/45558 709/224 |
| 2015/0281171 A1* | 10/2015 | Xiao | ....................... | H04L 47/70 709/225 |
| 2016/0285734 A1* | 9/2016 | Dempo | ................. | G06F 9/4856 |
| 2016/0323123 A1 | 11/2016 | Kapadia et al. | | |
| 2016/0352632 A1* | 12/2016 | Nedeltchev | ........... | H04L 45/502 |
| 2016/0380909 A1* | 12/2016 | Antony | ................. | H04L 47/722 370/236 |
| 2017/0078198 A1* | 3/2017 | Nellikar | ................ | H04L 45/745 |
| 2017/0104672 A1* | 4/2017 | Liang | ...................... | H04L 45/30 |
| 2017/0180274 A1* | 6/2017 | Liu | ..................... | H04L 12/6418 |
| 2017/0353433 A1* | 12/2017 | Antony | ................... | H04L 49/70 |
| 2018/0019948 A1* | 1/2018 | Patwardhan | .......... | H04L 47/125 |
| 2018/0063176 A1* | 3/2018 | Katrekar | ............. | H04L 63/1425 |
| 2018/0159801 A1* | 6/2018 | Rajan | ..................... | H04L 49/70 |

OTHER PUBLICATIONS

English Translation of Xiaodong, D., "Cloud Data Center SDN / NFV Application Analysis," Telecommunications Technology, China Mobile Communications Research Institute, Jul. 2015, 1 page.

Mellanox Technologies "Mellanox Introduces New Bluefield Family of System-on-Chip Programmable Processors for Storage and Networking Applications," Press Releases, http://www.mellanox.com/page/press_release_item?id=1733, Jun. 1, 2016, 3 pages.

Foreign Communication From a Counterpart Application, PCT Application No. PCT/CN2016/110803, International Search Report dated Aug. 18, 2017, 7 pages.

Foreign Communication From a Counterpart Application, PCT Application No. PCT/CN2016/110803, Written Opinion dated Aug. 18, 2017, 3 pages.

* cited by examiner

DATA PACKET PROCESSING METHOD, HOST, AND SYSTEM

CROSS-REFERENCE TO RELATED APPLICATIONS

This application is a continuation of International Patent Application No. PCT/CN2016/110803 filed on Dec. 19, 2016, which is hereby incorporated by reference in its entirety.

TECHNICAL FIELD

The present disclosure relates to the field of information technology (IT) technologies, and in particular, to a data packet processing method, a host, and a system.

BACKGROUND

The development of virtualization technologies is accompanied with emergence of different types of virtualization technologies, for example, ESXi of VMWARE Incorporation, HYPER-V of MICROSOFT Corporation, Kernel-based Virtual Machine (KVM), XEN of CITRIX Systems, and container. Multiple computing instances can be obtained on a host by means of virtualization using a virtualization technology.

A cloud resource pool includes multiple hosts. Hosts using different virtualization technologies may constitute different types of cloud resource pools. For example, cloud resource pool types include a VMWARE cloud resource pool, a HYPER-V cloud resource pool, a KVM cloud resource pool, a XEN cloud resource pool, and the like.

Different types of cloud resource pools are opened to different degrees. Therefore, different types of cloud resource pools provide different virtual private cloud (VPC) network features. Basically, to implement an advanced network feature, a user needs to purchase a dedicated network component. For example, a virtual standard switch (VSS)/virtual distributed switch (VDS) may be deployed for an ESXi host in the VMWARE cloud resource pool. The VSS/VDS is capable of providing a layer 2 (L2) forwarding capability. If the ESXi host needs to implement a network feature such as a security group, layer 3 (L3) routing, or the Dynamic Host Configuration Protocol (DHCP), a corresponding network component needs to be purchased. Therefore, when a user uses a cloud computing system that includes different types of multiple cloud resource pools, it is inconvenient to manage the cloud resource pools because the resource pools provide different network features, and complexity of deploying the cloud computing system is also increased.

SUMMARY

This application discloses a data packet processing method, a host, and a system to transfer processing of a VPC network feature of a data packet to a network processing device coupled to a host such that the VPC network feature is no longer limited by a resource pool type. This facilitates dynamic management of a VPC network feature of a computing instance, and reduces complexity of deploying a cloud computing system.

According to a first aspect, this application provides a data packet processing method. The data packet processing method is applied to a cloud computing system, and the cloud computing system includes a cloud management platform and at least one host. Hosts in the cloud computing system may be hosts that use different virtualization technologies. The virtualization technologies include but are not limited to a VMWARE virtualization technology, a HYPER-V virtualization technology, a XEN virtualization technology, and a KVM virtualization technology. The host includes a virtual switch and a network processing device. Multiple computing instances run on the host. The computing instances may be virtual machines or containers. Virtual local area network (VLAN) identifiers are configured for virtual ports of the multiple computing instances. A virtual port indicates a logical port of a virtual network interface card of a computing instance, and VLAN identifiers of virtual ports of computing instances on a same host are different from each other. A VLAN identifier indicates an identifier of a VLAN to which a virtual port belongs. The different VLAN identifiers of the virtual ports on the host indicate different VLANs to which the virtual ports belong. In this way, the computing instances on the host are in different VLANs, and cannot interwork with each other directly. The host communicates with another device in the cloud computing system using the network processing device. The other communications device includes but is not limited to a switch, a router, a network processing device, or another host in the cloud computing system.

The cloud management platform sends VPC network information of a computing instance running on the host to the network processing device according to a correspondence between a management network Internet Protocol (IP) address of the host and a management network IP address of the network processing device. The management network IP address indicates an IP address in a management network, and the management network mainly transmits a control command. The VPC network information indicates a data packet processing rule, and the VPC network information includes but is not limited to one or more of a DHCP rule, a port security rule, an L2 forwarding rule, an L3 routing rule, or a tunnel encapsulation rule.

The virtual switch receives a data packet that is sent by the computing instance using a virtual port of the computing instance, and the data packet carries a network address of the computing instance and a VLAN identifier of the virtual port that sends the data packet. Because the VLAN identifiers of the virtual ports of the computing instances on the host are different, the computing instances cannot communicate with each other directly. The virtual switch sends the data packet to the network processing device, that is, the virtual switch sends the data packet according to the VLAN identifier, and routes the data packet to the network processing device.

The network processing device receives the data packet, determines the VPC network information of the computing instance according to the network address of the computing instance, performs network function processing on the data packet, and sends the data packet.

By implementing the foregoing embodiment, the host diverts the data packet of the computing instance to the network processing device, and the network processing device performs corresponding processing on the data packet according to preconfigured VPC network information. The network processing device may implement complete VPC network feature processing, and may add or remove a VPC network feature of the computing instance according to a requirement in order to facilitate VPC network feature management of the computing instance and reduce costs of deploying a cloud resource pool.

In a possible implementation of the first aspect, the data packet processing method further includes receiving, by the network processing device, online information sent by the cloud management platform, where the online information includes a service network IP address of another network processing device and a network address of a computing instance running on a host connected to the other network processing device.

By implementing the foregoing embodiment, the cloud management platform sends online information of the virtual port of the computing instance to another network processing device within a management range. In this way, when the computing instance gets online, the other network processing device in the cloud management platform can learn the network address of the computing instance and a service network IP of the network processing device in time.

In a possible implementation of the first aspect, the data packet processing method further includes determining, by the network processing device according to a destination network address of the data packet, a service network IP address of a network processing device corresponding to a destination computing instance of the data packet, establishing a tunnel between the network processing device and the network processing device corresponding to the destination computing instance of the data packet, and sending the data packet using the established tunnel, where the data packet carries a source network address and the destination network address, both the source network address and the destination network address are service network IP addresses, the source network address is the network address of the computing instance that sends the data packet, and the destination network address is a network address of a computing instance that receives the data packet.

By implementing the foregoing embodiment, the network processing device establishes the tunnel between the network processing device and the network processing device corresponding to the destination computing instance using the destination network address of the data packet, and can forward the data packet to the destination computing instance using the tunnel. In this way, the data packet can be sent to a peer end using a public network.

In a possible implementation of the first aspect, the network processing device is connected to the host using a peripheral component interconnect (PCI) bus, and is used as a network interface card of the host to provide a network access service for the host, when a quantity m of network ports of the network processing device is greater than a quantity n of network ports of the host, any n network ports in the m network ports of the network processing device are connected to the n network ports of the host in a one-to-one manner, where both m and n are positive integers greater than 1, or when a quantity m of network ports of the network processing device is less than or equal to a quantity n of network ports of the host, the m network ports of the network processing device are connected to the n network ports of the host using a physical switching device, where both m and n are positive integers greater than 1, and the physical switching device may be a switch.

In a possible implementation of the first aspect, the cloud management platform allocates the management network IP address and a service network IP address to the network processing device, and records the correspondence between the management network IP address of the host and the management network IP address of the network processing device.

In a possible implementation of the first aspect, before sending, by the cloud management platform, VPC network information of a computing instance running on the host to the network processing device, the data packet processing method further includes sending, by the cloud management platform, an instance creation request to the host, where the instance creation request carries resource configuration information and the network address that are of the computing instance, the resource configuration information indicates configuration information of a hardware resource and a software resource that are allocated to the computing instance, for example, specifications of a central processing unit (CPU), a memory, and a magnetic disk that are allocated to the computing instance, and types of an operating system and an application program that are installed in the computing instance, and the network address indicates an address of the virtual port of the computing instance, and may be an IP address and a media access control (MAC) address, creating, by the host, the computing instance and the virtual port of the computing instance according to the resource configuration information and the network address, and returning, to the cloud management platform, an indication message that the computing instance is successfully created, where the indication message carries the management network IP address of the host and the network address of the computing instance, and allocating, by the cloud management platform, the VLAN identifier to the virtual port of the created computing instance, where the allocated VLAN identifier is different from a VLAN identifier of any existing virtual port on the host.

In a possible implementation of the first aspect, after sending, by the cloud management platform, VPC network information of a computing instance running on the host to the network processing device, the data packet processing method further includes creating, by the network processing device according to the received VPC network information, a virtual network element that provides a network processing function for the computing instance, where each virtual network element may correspond to a virtual port, and the virtual network element may provide the network processing function using the virtual port, and determining, by the network processing device, the VPC network information of the computing instance according to the network address of the computing instance, and performing network function processing on the data packet includes determining, by the network processing device according to the source network address of the data packet, the virtual network element corresponding to the computing instance such that the determined virtual network element provides the network processing function for the computing instance.

In a possible implementation of the first aspect, the cloud computing system further includes another host, the other host is a destination host of the data packet, and the destination computing instance runs on the destination host, and the method further includes receiving, by the destination network processing device corresponding to the destination host, the data packet, determining VPC network information of the destination computing instance according to the destination network address of the data packet, performing network function processing on the data packet according to the VPC network information of the destination computing instance, and sending the data packet to the destination computing instance on the destination host.

According to a second aspect, this application provides a data packet processing method. The data packet processing method is applied to a host, and the host includes a virtual switch and a network processing device. Multiple computing instances run on the host, and the computing instances include but are not limited to a virtual machine and a container. The host implements a running environment of the virtual machine or the container using a virtualization technology, and the virtualization technology includes but is not limited to a VMWARE virtualization technology, a HYPER-V virtualization technology, a XEN virtualization technology, and a KVM virtualization technology. VLAN identifiers are configured for virtual ports of the multiple computing instances and the VLAN identifiers of the virtual ports of the computing instances are different from each other. The host communicates with another device in a cloud computing system using the network processing device. The method includes receiving, by the network processing device, VPC network information that is of a computing instance running on the host and that is sent by a cloud management platform, where the VPC network information indicates a data packet processing rule, and the VPC network information includes but is not limited to one or more of a DHCP rule, a port security rule, an L2 forwarding rule, an L3 routing rule, or a tunnel encapsulation rule, sending, by the computing instance, a data packet using a virtual port of the computing instance, where the data packet carries a network address of the computing instance and a VLAN identifier of the virtual port that sends the data packet, sending, by the virtual switch, the data packet according to the VLAN identifier, and routing the data packet to the network processing device, and receiving, by the network processing device, the data packet, determining the VPC network information of the computing instance according to the network address of the computing instance, performing network function processing on the data packet, and sending the data packet.

By implementing the foregoing embodiment, the host diverts the data packet of the computing instance to the network processing device, and the network processing device performs corresponding processing on the data packet according to preconfigured VPC network information. The network processing device implements complete VPC network feature processing, and may add or remove a VPC network feature of the computing instance according to a requirement in order to facilitate VPC network feature management of the computing instance and reduce costs of deploying a cloud resource pool.

In a possible implementation of the second aspect, the network processing device receives online information sent by the cloud management platform, and the online information includes a service network IP address of another network processing device and a network address of a computing instance corresponding to the other network processing device. The network processing device determines, according to a destination network address of the data packet, a service network IP address of a network processing device corresponding to a destination computing instance of the data packet, establishes a tunnel between the network processing device and the network processing device corresponding to the destination computing instance of the data packet, and sends the data packet using the established tunnel.

In a possible implementation of the second aspect, the network processing device is connected to the host using a bus, and is used as a network interface card of the host to provide a network access service for the host, when a quantity m of network ports of the network processing device is greater than a quantity n of network ports of the host, any n network ports in the m network ports of the network processing device are connected to the n network ports of the host in a one-to-one manner, where both m and n are positive integers greater than 1, or when a quantity m of network ports of the network processing device is less than a quantity n of network ports of the host, the m network ports of the network processing device are connected to the n network ports of the host using a physical switching device, where both m and n are positive integers greater than 1.

In a possible implementation of the second aspect, the data packet processing method further includes creating, by the network processing device according to the received VPC network information, a virtual network element that provides a network processing function for the computing instance, where each virtual network element may correspond to a virtual port, and the virtual network element may provide the network processing function using the virtual port, and determining, by the network processing device, the VPC network information of the computing instance according to the network address of the computing instance, and performing network function processing on the data packet includes determining, by the network processing device according to a source network address of the data packet, the virtual network element corresponding to the computing instance such that the determined virtual network element provides the network processing function for the computing instance.

According to a third aspect, this application discloses a cloud computing system. The cloud computing system includes a cloud management platform and at least one host. The cloud management platform is configured to management a host in a cloud resource pool. Each cloud resource pool includes one or more hosts, and the cloud resource pool includes but is not limited to an ESXi cloud resource pool, a HYPER-V cloud resource pool of MICROSOFT Corporation, a XEN cloud resource pool, and a KVM cloud resource pool. The host includes a virtual switch and a network processing device. Multiple computing instances run on the host, and the computing instances include but are not limited to a container and a virtual machine. VLAN identifiers are configured for virtual ports of the multiple computing instances. A virtual port of a computing instance indicates a logical port of a virtual network interface card, and a VLAN identifier indicates an identity of a VLAN to which a virtual port belongs. The VLAN identifiers configured for the virtual ports of the computing instances on the host are different from each other, that is, a virtual port of each computing instance belongs to a different VLAN. In this way, the computing instances on the host cannot interwork with each other directly. The host is connected to the network processing device. The host communicates with another device in the cloud computing system using the network processing device.

The cloud management platform is configured to send VPC network information of a computing instance running on the host to the network processing device according to a correspondence between a management network IP address of the host and a management network IP address of the network processing device. The virtual switch is configured to receive a data packet that is sent by the computing instance using a virtual port of the computing instance, where the data packet carries a network address of the computing instance and a VLAN identifier of the virtual port that sends the data packet. The virtual switch is further configured to send the data packet according to the VLAN identifier, and route the data packet to the network processing device, and the network processing device is configured to receive the data packet, determine the VPC network information of the computing instance according to the network address of the computing instance, perform network function processing on the data packet, and send the data packet.

In a possible implementation of the third aspect, the cloud management platform is further configured to send online information of the virtual port of the computing instance to another network processing device within a management range, and the online information includes the network address of the computing instance and a service network IP address of the network processing device.

In a possible implementation of the third aspect, the network processing device is further configured to receive the online information sent by the cloud management platform, where the online information includes a service network IP address of another network processing device and a network address of a computing instance running on a host connected to the other network processing device, determine, according to a destination network address of the data packet, a service network IP address of a network processing device corresponding to a destination computing instance of the data packet, establish a tunnel between the network processing device and the network processing device corresponding to the destination computing instance of the data packet, and send the data packet using the established tunnel.

In a possible implementation of the third aspect, the cloud management platform is further configured to send an instance creation request to the host, where the instance creation request carries resource configuration information and the network address that are of the computing instance. The host is further configured to create the computing instance and a network port of the computing instance according to the resource configuration information and the network address, and return, to the cloud management platform, an indication message that the computing instance is successfully created, where the indication message carries the management network IP address of the host and the network address of the computing instance, and the cloud management platform is further configured to allocate the VLAN identifier to the virtual port of the created computing instance, where the allocated VLAN identifier is different from a VLAN identifier of any existing virtual port on the host.

In a possible implementation of the third aspect, the network processing device is further configured to create, according to the received VPC network information, a virtual network element that provides a network processing function for the computing instance, and determining, by the network processing device, the VPC network information of the computing instance according to the network address of the computing instance, and performing network function processing on the data packet includes determining, by the network processing device according to a source network address of the data packet, the virtual network element corresponding to the computing instance such that the determined virtual network element provides the network processing function for the computing instance.

In a possible implementation of the third aspect, the cloud computing system further includes another host. The other host is a destination host of the data packet. The destination computing instance runs on the destination host. The destination network processing device corresponding to the destination host is configured to receive the data packet, determine VPC network information of the destination computing instance according to the destination network address of the data packet, perform network function processing on the data packet according to the determined VPC network information, and send the data packet to the destination computing instance on the destination host.

According to a fourth aspect, this application provides a host, where the host includes a virtual switch and a network processing device, multiple computing instances run on the host, VLAN identifiers are configured for virtual ports of the multiple computing instances, the VLAN identifiers of the virtual ports of the computing instances are different from each other, and the host communicates with another device in a cloud computing system using the network processing device. The network processing device is configured to receive VPC network information that is of a computing instance running on the host and that is sent by a cloud management platform. The computing instance is configured to send a data packet using a virtual port of the computing instance, where the data packet carries a network address of the computing instance and a VLAN identifier of the virtual port that sends the data packet. The virtual switch is configured to send the data packet according to the VLAN identifier, and route the data packet to the network processing device, and the network processing device is configured to receive the data packet, determine the VPC network information of the computing instance according to the network address of the computing instance, perform network function processing on the data packet, and send the data packet.

According to a fifth aspect, this application provides a host, including a first processor, a first memory, and a network processing device, where the network processing device includes a second processor and a second memory, multiple computing instances run on the host, VLAN identifiers are configured for virtual ports of the multiple computing instances, the VLAN identifiers of the virtual ports of the computing instances are different from each other, the first memory and the second memory store instructions, the first processor executes an instruction in the first memory to implement a function of a computing instance running on the host in the foregoing aspects, the first processor executes an instruction in the first memory to implement a function of a virtual switch running on the host in the foregoing aspects, and the second processor is configured to execute an instruction in the second memory to implement network function processing on a data packet sent by a computing instance in the foregoing aspects.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure.

Figure 1:
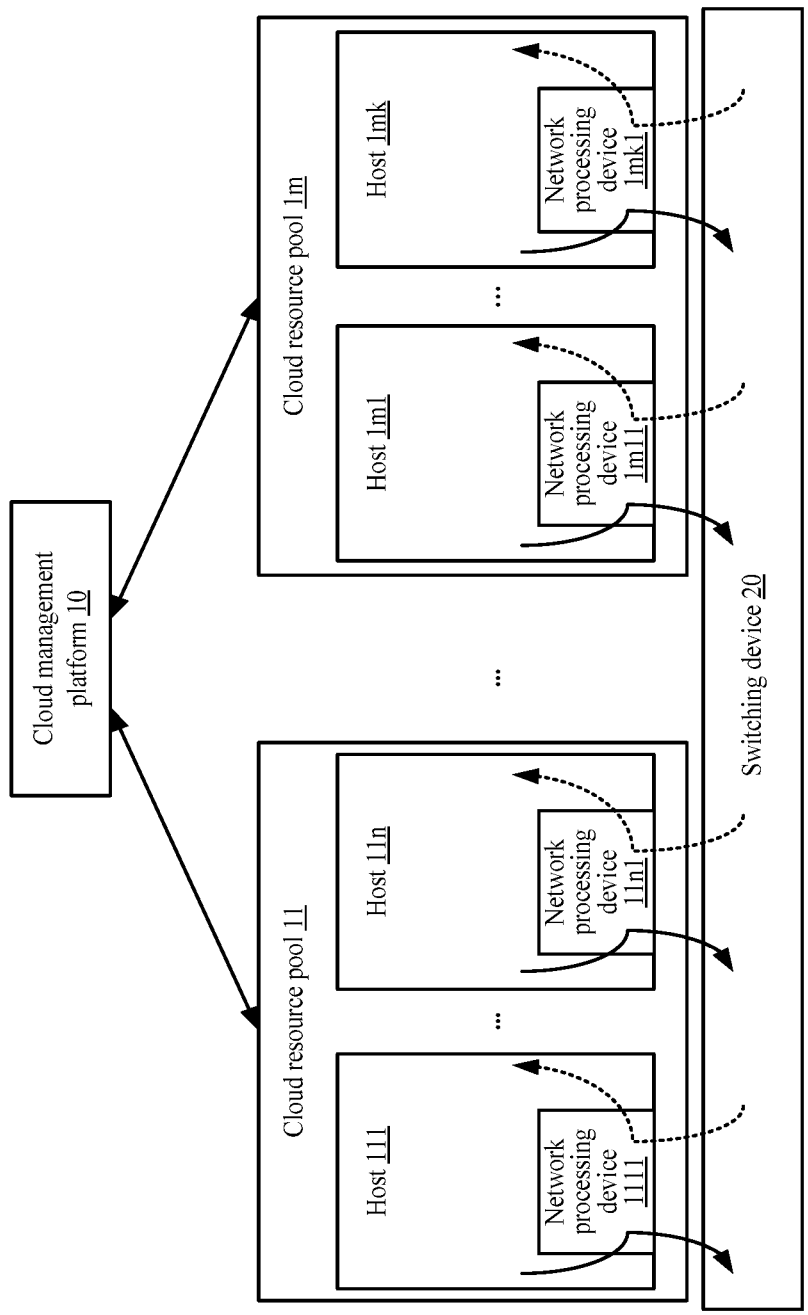
FIG. 1 is a schematic structural diagram of a cloud computing system according to an embodiment of the present disclosure.

Referring to FIG. 1, FIG. 1 is a schematic structural diagram of a cloud computing system according to an embodiment of the present disclosure. The cloud computing system includes a cloud management platform 10, a switching device 20, a cloud resource pool 11, . . . , and a cloud resource pool 1m, where m is an integer greater than 2. Each cloud resource pool may include multiple hosts and a network processing device associated with the hosts. In a possible implementation, each host may be connected to one network processing device. A specific form of the network processing device may be an embedded board, and an operating system is installed on the embedded board. A complete VPC network feature can be implemented using the operating system. In another possible implementation, one network processing device may be connected to multiple hosts, and provide a network function processing service for the multiple hosts at the same time. A quantity of hosts served by one network processing device may be set according to a processing capability of the network processing device. This is not limited in this embodiment.

It may be understood that, in addition to the embedded board, the network processing device may also be a hardware server that implements network function processing. The host may be connected to the hardware server using a switch. The network processing device may be connected to the host using an existing communications protocol. The communications protocol includes but is not limited to the PCI Express (PCIE) protocol, the Universal Serial Bus (USB) protocol, or the Serial Advanced Technology Attachment (SATA) protocol.

For example, as shown in FIG. 1, the cloud resource pool 11 includes n hosts 111 to 11n and n network processing devices 1111 to 11n1, and the cloud resource pool 1m includes k hosts 1m1 to 1mk and k network processing devices 1m11 to 1mk1. Each host is connected to one network processing device. The cloud resource pools 11 to 1m include multiple types of cloud resource pools. According to a computing capability providing manner, cloud resource pools are classified into bare-metal cloud resource pools and virtualized cloud resource pools. In the virtualized cloud resource pool, a host provides a computing capability for multiple users using a virtualization technology, a computing instance deployed on the host is a virtual machine or a container, and multiple computing instances may be deployed on one host. In the bare-metal cloud resource pool, a host directly provides a computing capability of the host for a user, and a computing instance deployed on the host is bare metal, that is, the host itself. According to different virtualization technologies, the virtualized cloud resource pool may further include an ESXi cloud resource pool of VMWARE Incorporation, a HYPER-V cloud resource pool of MICROSOFT Corporation, a XEN cloud resource pool, and a KVM cloud resource pool. The switching device 20 is configured to receive and forward a data packet of the network processing device, and provide a routing and forwarding function for the computing instance deployed on the host. The switching device 20 includes but is not limited to an L2 switch or an L3 switch.

Figure 2A:
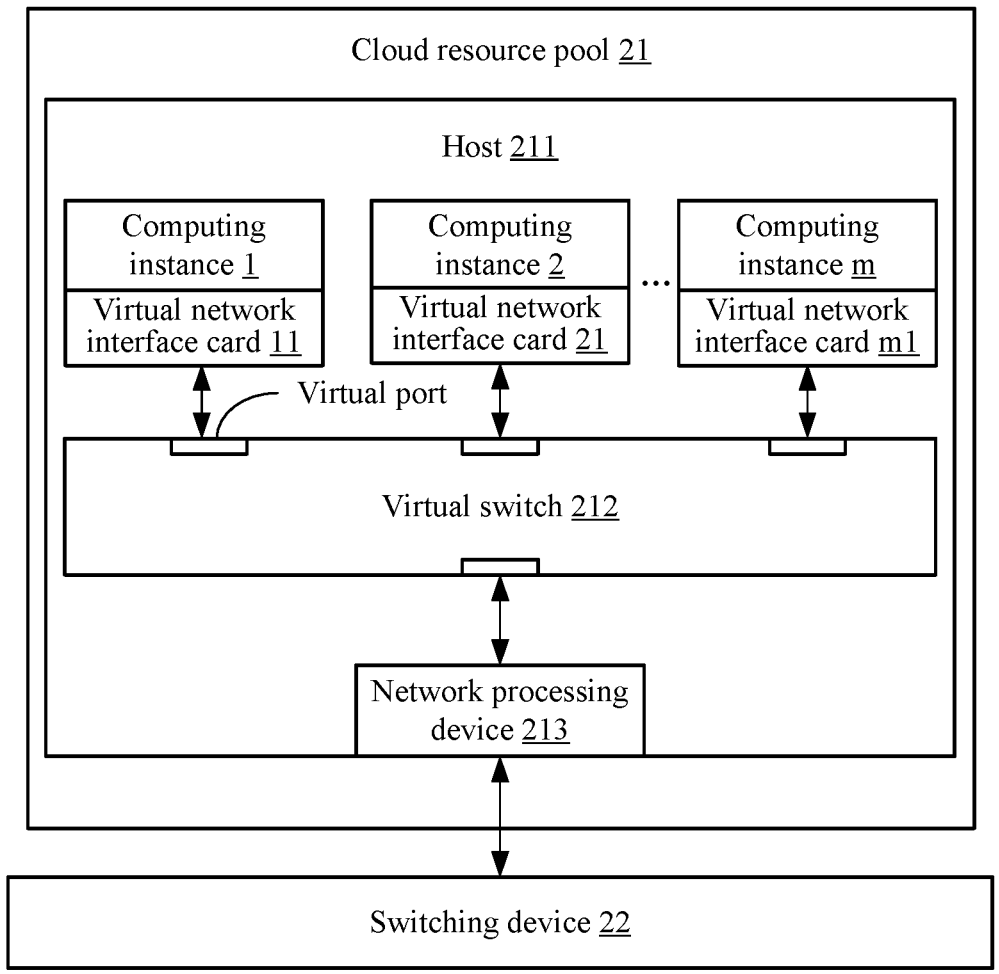
FIG. 2A and FIG. 2B are schematic structural diagrams of a host according to an embodiment of the present disclosure.

FIG. 2A is a schematic structural diagram of a host 211 according to an embodiment of the present disclosure. In this embodiment of the present disclosure, the host 211 is located in a cloud resource pool 21, the host 211 is any host in the cloud resource pool 21, the host 211 includes a virtual switch 212 and a network processing device 213, multiple computing instances 1 to m are deployed on the host 211, m is an integer greater than 0, and the computing instances 1 to m may be virtual machines or containers. The host 211 is a physical server. A bottom layer of the physical server is a hardware layer. The hardware layer includes hardware resources such as a CPU, a memory, a hard disk, and a network interface card. When the computing instances 1 to m are virtual machines, the host 211 implements a virtualized running environment of the computing instances 1 to m using virtualization software (for example, VMWARE ESXi or CITRIX Systems XEN). A software layer that is installed on the host 211 to implement a virtualized environment is referred to as a virtual machine monitor (VMM). The VMM is configured to schedule, allocate, and manage the hardware resources at the hardware layer. The computing instances 1 to m run on the VMM. The VMM provides a virtualized hardware environment such as a CPU, a memory, a storage, an input/output (IO) device (such as a network interface card), and an Ethernet switch for each computing instance to ensure that the computing instances 1 to m run in an isolated manner.

The host 211 creates a virtual port for each computing instance, and the virtual port is a port corresponding to a virtual network interface card of the computing instance. In an embodiment, the computing instances 1 to m includes virtual network interface cards 11 to m1. The virtual switch 212 provides a capability of communication among the computing instances 1 to m and between the computing instance and an external network. The virtual port of each computing instance is connected to one or more virtual ports of the virtual switch 212. A data packet of the computing instance is sent to the virtual switch 212 using the virtual port, and the virtual switch 212 forwards the data packet to the network processing device 213 in order to implement communication between the computing instance and the network processing device 213. The network processing device 213 further coupled to a switching device 22.

In the host 211 shown in FIG. 2A, the network processing device 213 may be used as a physical network interface card to provide a network access capability for the computing instances 1 to m on the host 211.

Figure 2B:
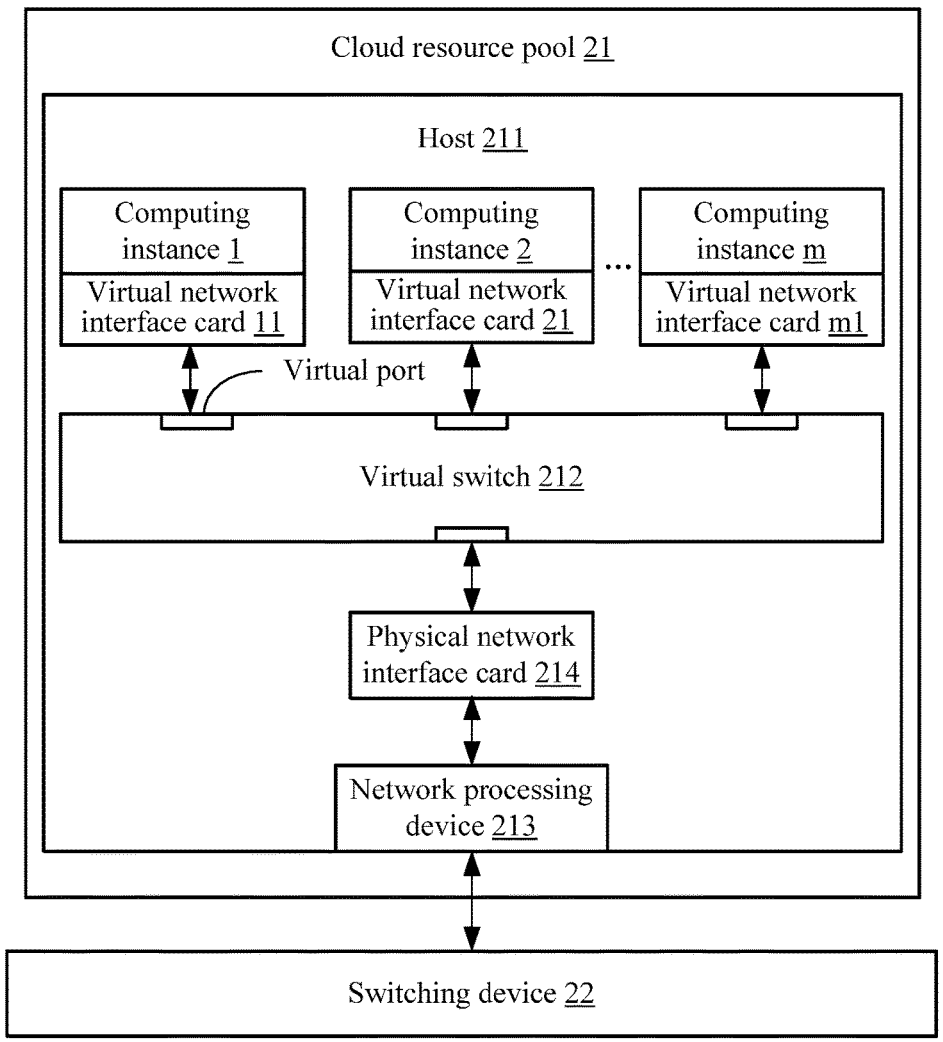

FIG. 2B is another schematic structural diagram of a host according to an embodiment of the present disclosure. A difference from the host in FIG. 2A lies in that a physical network interface card 214 is installed on a host 211 in FIG. 2B. The physical network interface card 214 is connected to a virtual switch 212, and the physical network interface card 214 is connected to the switching device 22 using the network processing device 213.

VLAN identifiers are configured for virtual ports of all computing instances deployed on the host 211, and the VLAN identifiers of the virtual ports of the computing instances are different from each other. For any computing instance on the host 211, the computing instance is configured to send, using a virtual port of the computing instance, a data packet to the virtual switch 212 disposed on the host 211. The data packet carries a VLAN identifier of the virtual port that sends the data packet. The virtual switch 212 is configured to receive the data packet sent by the computing instance. The virtual switch 212 obtains the VLAN identifier carried in the data packet. Because the VLAN identifiers of all the computing instances 1 to m on the host 211 are different from each other, all the computing instances 1 to m are isolated from each other. The virtual switch 212 can send the received data packet only to the physical network interface card 214 using an uplink port. The physical network interface card 214 forwards the data packet to the network processing device 213. The network processing device 213 receives the data packet sent by the virtual switch 212, and performs corresponding network function processing according to preconfigured VPC network information of the computing instance that sends the data packet.

Based on the foregoing schematic structural diagrams of the host 211, the host 211 diverts the data packet of the computing instance to the network processing device 213, and the network processing device 213 performs corresponding processing on the data packet according to the preconfigured VPC network information. The network processing device 213 implements complete VPC network feature processing, and may add or remove a VPC network feature of the computing instance according to a requirement in order to facilitate VPC network feature management of the computing instance and reduce costs of deploying a cloud resource pool.

Figure 3A:
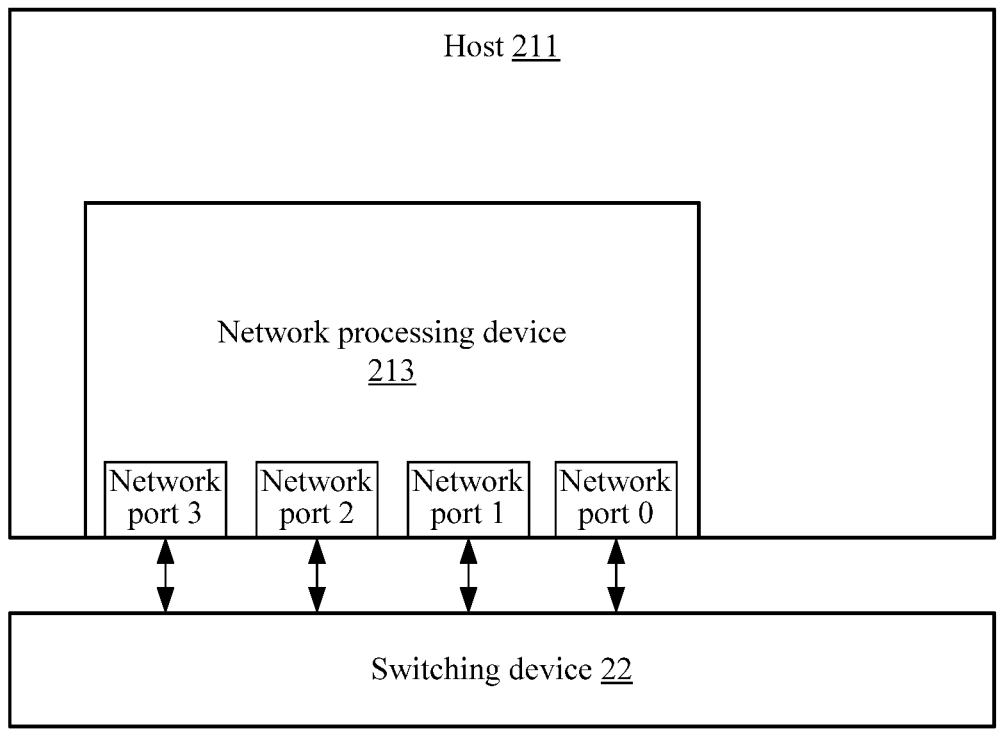
FIG. 3A, FIG. 3B and FIG. 3C are schematic diagrams of a connection between a network processing device and a host according to an embodiment of the present disclosure.

Referring to FIG. 3A, FIG. 3A is a schematic diagram of a connection between the network processing device 213 and the host 211 that are in FIG. 2A. A networking connection manner between the host 211 and the network processing device 213 may be a virtual port mode. In the virtual port mode, the network processing device 213 is connected to the host 211, for example, the network processing device 213 is connected to the host 211 using a PCI bus. A VMM on the host 211 provides a driver package for the network processing device 213. The driver package is loaded such that the host 211 identifies the network processing device 213 as a physical network interface card. A network port of the network processing device 213 is used as a network port of the host 211. The host 211 receives and sends data using the network processing device 213. In this way, both a packet sent by the host 211 and a packet received by the host 211 need to be processed by the network processing device 213. For the host 211, the network processing device 213 is a physical network interface card. Therefore, an IP address and a gateway address may be configured for the network processing device 213. The network processing device 213 is connected to a switching device 22 using the network port. The switching device 22 is configured to receive and forward a data packet of the network processing device 213, and provide a routing and forwarding function for computing instances 1 to m deployed on the host 211. The switching device 22 includes but is not limited to an L2 switch or an layer 3 switch.

Figure 3B:
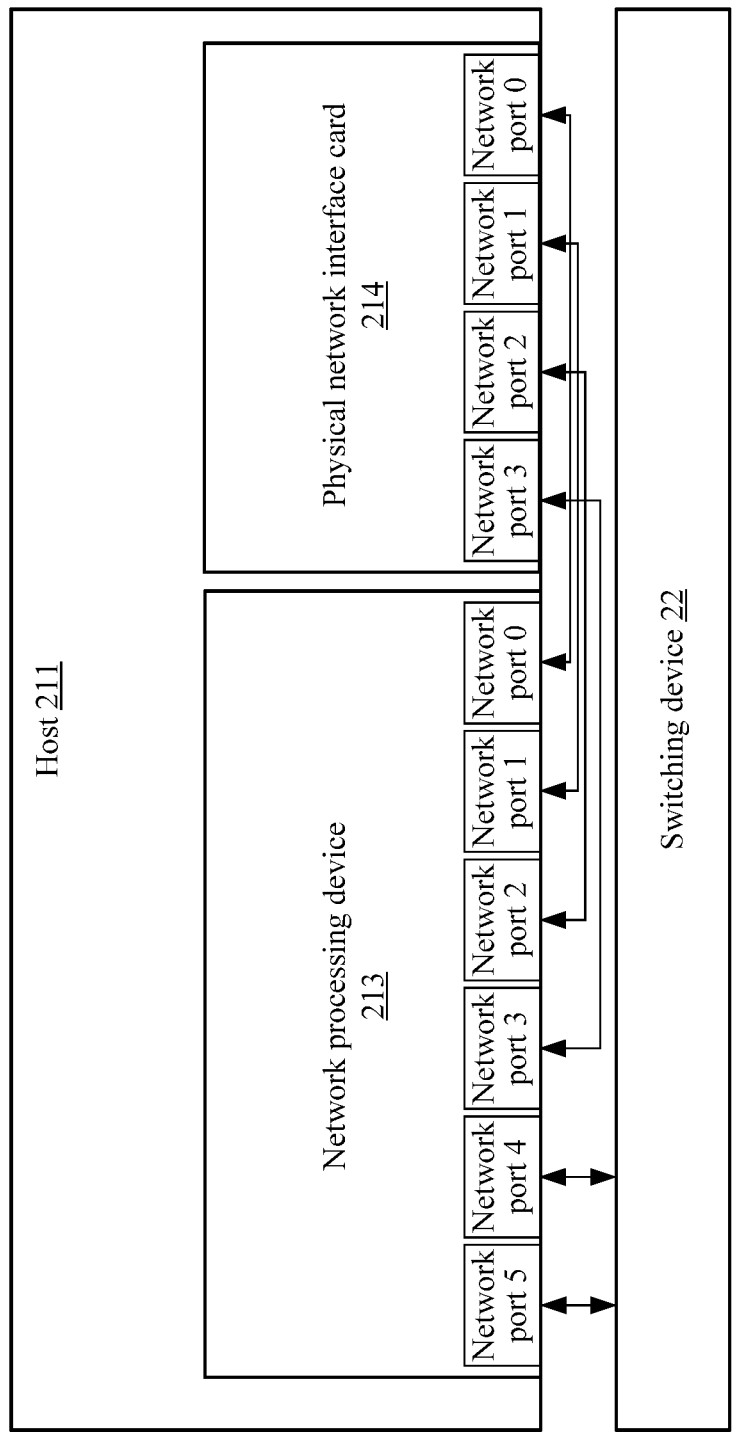

Referring to FIG. 3B, FIG. 3B is a schematic diagram of a connection between the network processing device 213 and the host 211 that are in FIG. 2B. In this embodiment, the host 211 has an independent physical network interface card 214. The network processing device 213 and the host 211 are connected in a back-to-back connection (i.e., Network Traffic Forwarded Back-to-Back) manner. In the back-to-back connection manner, when a quantity of network ports of the network processing device 213 is greater than a quantity of network ports of the physical network interface card 214, the network processing device 213 can provide a same quantity of network ports as the host 211 does. All network ports of the physical network interface card 214 are connected to the network ports of the network processing device 213 in a one-to-one manner.

Figure 3C:
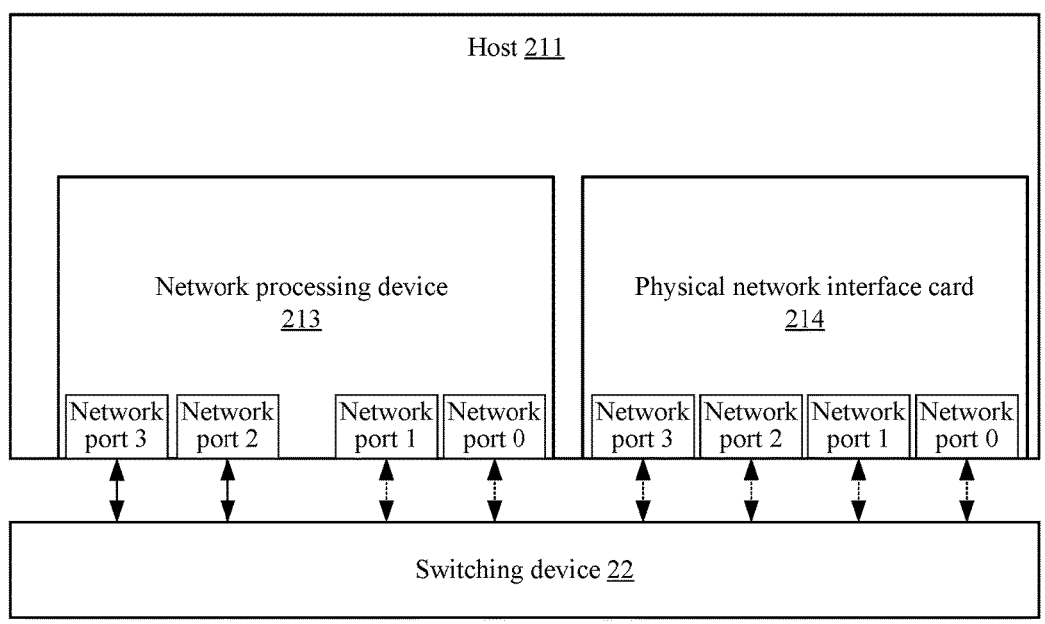

Referring to FIG. 3C, FIG. 3C is a schematic diagram of another connection between the network processing device 213 and the host 211 that are in FIG. 2B. In this embodiment, the host 211 has an independent physical network interface card 214. The network processing device and the host 211 are connected in a back-to-back relaying (i.e., Network Traffic Relayed Back-to-Back) manner. In the back-to-back relaying manner, a quantity of network ports of the physical network interface card 214 is greater than a quantity of network ports of the network processing device 213, and networking and connection cannot be implemented in a back-to-back connection manner. In this case, a network port of the physical network interface card 214 is first connected to a switching device 22, and then connected to a network port of the network processing device 213 using a network port of the switching device 22.

According to the foregoing three networking connection manners between the network processing device 213 and the host 211, and that computing instances 1 to m deployed on the host 211 are preset to an isolated mode, all data packets generated by all computing instances 1 to m deployed on the host 211 need to be diverted to the network processing device 213.

Figure 4A:
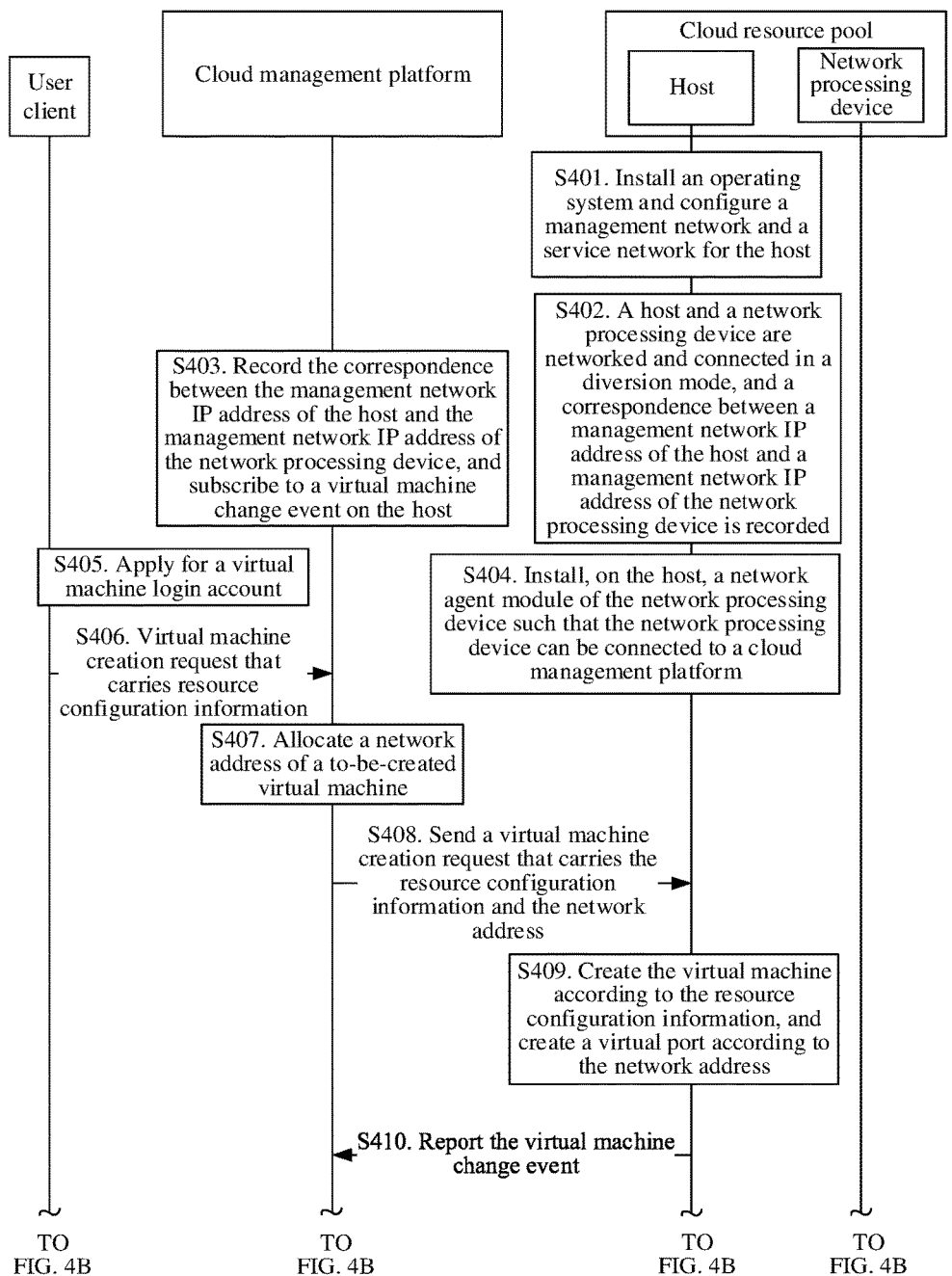
FIG. 4A and FIG. 4B are a schematic flowchart of a data packet processing method according to an embodiment of the present disclosure.
Figure 4B:
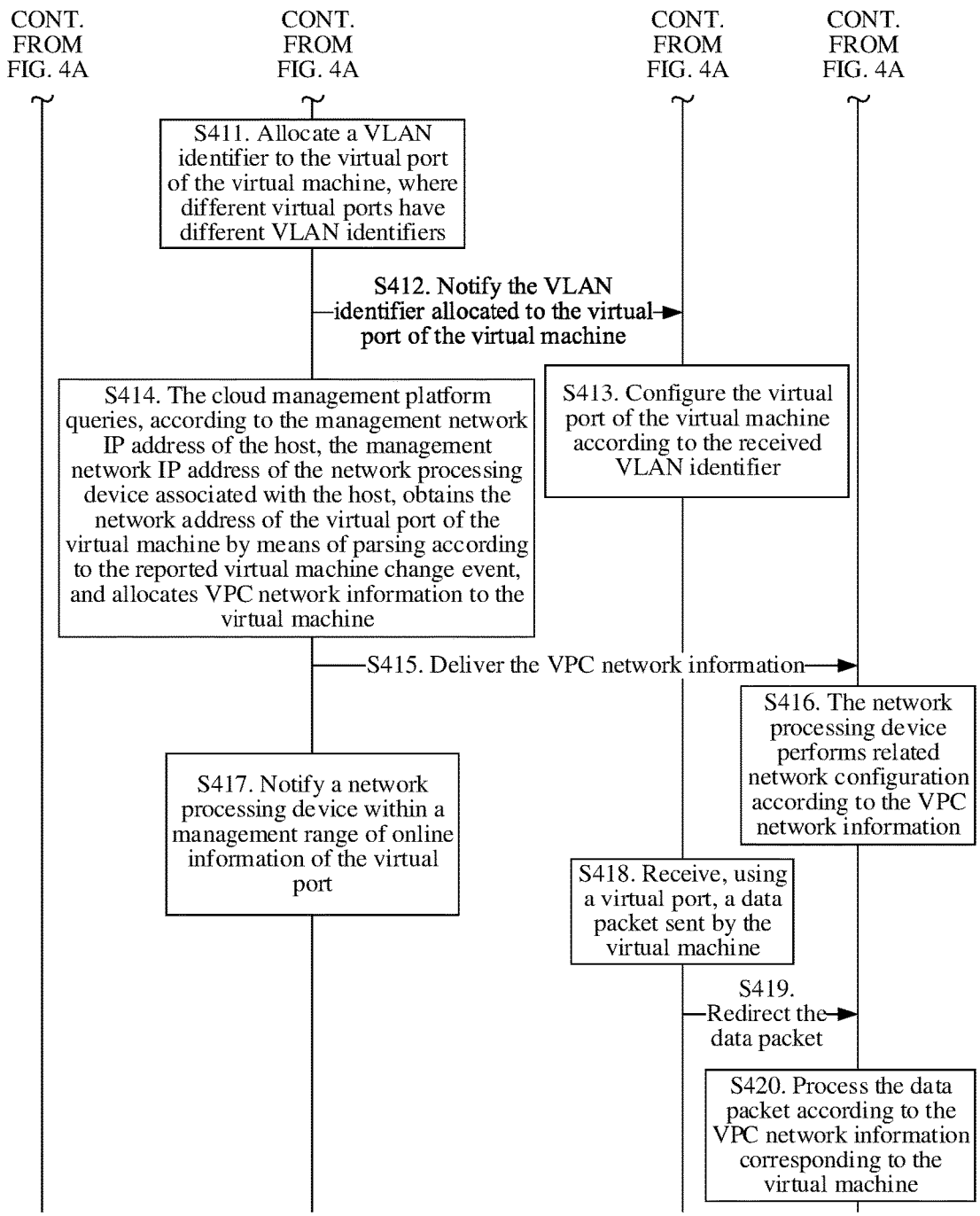

FIG. 2A and FIG. 2B are schematic structural diagrams of a host according to an embodiment of the present disclosure. FIG. 3A to FIG. 3C are schematic diagrams of a connection relationship between a host and a network processing device. With reference to structures and connection relationships in the foregoing schematic diagrams, a data packet processing procedure is further described in an embodiment of the present disclosure. Referring to FIG. 4A and FIG. 4B, FIG. 4A and FIG. 4B are a schematic flowchart of a data packet processing method according to an embodiment of the present disclosure. In this embodiment of the present disclosure, a cloud resource pool includes at least one host and a network processing device associated with the host. The method includes the following steps.

Step S401: Install an operating system for the host and configure a management network and a service network for the host.

The host in the cloud resource pool provides hardware resources such as a CPU resource, a memory resource, and a storage resource for a user. The host performs operations such as creating, canceling, configuring, migrating, and backing up a computing instance. Two transmission networks may be configured between hosts, that is, a management network and a service network. A control command is mainly transmitted in the management network, and a data packet is mainly transmitted in the service network. A host in the cloud resource pool is used as an example. A VMM runs on the host. The VMM abstracts hardware resources of the host as a resource pool using a virtualization technology, and provides the resource pool for multiple computing instances (i.e., virtual machines or containers) deployed on the host. When the host gets online, a cloud management platform allocates a management network IP address and a service network IP address to the host. The management network IP address of the host is used to receive or send a control command, and the service network IP address of the host is used to receive or send a data packet.

It should be noted that, in this step, the host may be configured in a conventional technical manner. This is not limited in the present disclosure.

Step S402: The host and the network processing device are networked and connected in a diversion mode, and the host records a correspondence between a management network IP address of the host and a management network IP address of the network processing device.

The network processing device and the host may be connected using a PCI interface. The host may further supply power to the network processing device using the PCI interface. Certainly, the network processing device may also be powered by a power supply of the network processing device. The cloud management platform may allocate the management network IP address and a service network IP address to the network processing device. The IP addresses may be allocated dynamically using the DHCP protocol, or may be allocated statically. The cloud management platform notifies the host of the management network IP address and the service network IP address that are allocated to the network processing device. The host configures the management network IP address and the service network IP address for the network processing device. The host may record the correspondence between the management network IP address of the network processing device and the management network IP address of the host. The host notifies the cloud management platform of the correspondence.

The network processing device and the host are networked and connected in a preset diversion mode. Networking and connection manners are classified into a virtual port manner, a back-to-back connection manner, and a back-to-back relaying manner. For a networking and connection manner between the network processing device and the host, refer to the descriptions of FIG. 3A to FIG. 3C. Details are not described herein again.

Step S403: A cloud management platform records the correspondence between the management network IP address of the host and the management network IP address of the network processing device, and subscribes to a virtual machine change event on the host.

The cloud management platform is connected to the host. The cloud management platform allocates a network access account to the host and performs network configuration on the host such that the host can access the Internet. The network configuration includes but is not limited to domain name system (DNS) configuration, gateway configuration, and operator configuration. The cloud management platform records the correspondence between the management network IP address of the host and the management network IP address of the network processing device, and saves the correspondence. The correspondence obtained by the cloud management platform may be reported by the host. The cloud management platform subscribes to the virtual machine change event on the host. The virtual machine change event indicates an event that a status or configuration of a virtual machine on the host changes. The virtual machine change event includes but is not limited to creating a virtual machine, removing a virtual machine, reconfiguring a network address of a virtual machine, and reconfiguring backup data of a virtual machine. When the status or the configuration of the virtual machine on the host changes, the virtual machine change event needs to be sent to the cloud management platform such that a related parameter that is of the virtual machine and that is recorded by the cloud management platform keeps synchronous with that of the host.

Step S404: Install, on the host, a network agent module of the network processing device such that the network processing device can be connected to the cloud management platform.

The network agent module is configured to communicate with the cloud management platform. The network processing device and the cloud management platform may communicate with each other using an IP communications protocol. The IP communications protocol includes but is not limited to the Remote Procedure Call Protocol (RPC), the SOCKET, the Hyper Text Transfer Protocol over Secure Socket Layer (HTTPS), and the like.

Step S405: A user client applies for a virtual machine login account.

The login account is used to verify a user identity. The user client may apply to the cloud management platform for the login account by means of registration. The cloud management platform allocates the login account to the user client according to a preset account generation rule.

Step S406: The user client sends, to the cloud management platform, a virtual machine creation request that carries resource configuration information.

The virtual machine creation request is used to create a virtual machine. The resource configuration information indicates a hardware resource parameter allocated to the to-be-created virtual machine. The resource configuration information includes but is not limited to a core quantity of CPUs, frequency of a CPU, a size and a read/write speed of a memory, a size and a read/write speed of a magnetic disk, and the like. In an example in this embodiment of the present disclosure, the computing instance is a virtual machine. A person skilled in the art may understand that this embodiment of the present disclosure is also applicable when the computing instance is a container.

Step S407: The cloud management platform allocates a network address to a to-be-created virtual machine.

The network address is a network address of a virtual port of the to-be-created virtual machine. The virtual port of the virtual machine indicates a port of a virtual network interface card of the virtual machine. One virtual network interface card may have one or more virtual ports. The network address includes but is not limited to a MAC address and an IP address.

Step S408: The cloud management platform sends the virtual machine creation request to the host, where the virtual machine creation request carries the resource configuration information and the network address.

The network address is the network address allocated in step S407.

It should be noted that a processing procedure of the virtual machine creation request in this step differs slightly for different types of cloud resource pools. For example, for an ESXi host of VMWARE, the cloud management platform sends the virtual machine creation request to the host using a VCENTER, for a resource pool of a KVM type, the cloud management platform may directly send the virtual machine creation request to the host.

Step S409: The host creates the virtual machine according to the resource configuration information, and creates a virtual port according to the network address.

The host creates the virtual machine on the host according to the resource configuration information. After successfully creating the virtual machine, the host creates the virtual port of the virtual machine according to the network address.

Step S410: The host reports the virtual machine change event to the cloud management platform.

The virtual machine change event carries the management network IP address of the host, virtual port information of the virtual machine created in step S409, and indication information indicating that the virtual machine is successfully created. The virtual port information includes but is not limited to a port identifier (for example, a universally unique identifier (UUID)) and a network address (for example, a MAC address and an IP address) that are of the virtual port.

The cloud management platform may further send virtual port online information to another host within a management range. The other host may save the virtual port online information according to a requirement. Further, the management range may be one or more cloud resource pools managed by the cloud management platform.

Step S411: The cloud management platform allocates a VLAN identifier to the virtual port of the virtual machine, where different virtual ports on the host have different VLAN identifiers.

The cloud management platform may record a VLAN identifier of a created virtual port on each host. When allocating the VLAN identifier to the virtual port of the virtual machine created in step S409, the cloud management platform needs to ensure that the allocated VLAN identifier is different from VLAN identifiers of all created virtual ports, that is, ensure that VLAN identifiers of all virtual ports on the host are all different from each other. In this way, even if two virtual machines are connected to a same network (located in a same host), different VLAN identifiers are allocated to virtual ports of the virtual machines. A virtual switch of the host has only an L2 capability. After different VLAN identifiers are allocated to different virtual ports, the different virtual ports are located in different VLANs. Therefore, all data packets on the host can be transmitted using only an uplink port of an internally disposed virtual switch such that the virtual switch forwards the data packet to the network processing device, thereby diverting a packet on the host to the network processing device.

In a possible implementation, the cloud management platform may allocate the VLAN identifier to the virtual port of the virtual machine using the following method. The cloud management platform maintains a VLAN identifier resource pool, where the VLAN identifier resource pool stores VLAN identifiers within a specified value range, each VLAN identifier has two states, an unused state and a used state, where the unused state indicates that the VLAN identifier has not been allocated to any virtual port, and the used state indicates that the VLAN identifier has been allocated to a virtual port of a virtual machine on the host, and when needing to allocate a VLAN identifier to a virtual port of a newly created virtual machine, the cloud management platform obtains a VLAN identifier in the unused state from the VLAN identifier resource pool, and allocates the VLAN identifier to the virtual port.

Step S412: The cloud management platform notifies the host of the VLAN identifier allocated to the virtual port of the virtual machine.

Step S413: The host configures the virtual port of the virtual machine according to the received VLAN identifier.

A virtual switch (for example, a VSS or a VDS) is deployed inside the host. Virtual ports of all virtual machines on the host are all connected to the virtual switch. In a possible implementation, the virtual machine may have multiple virtual ports, and the multiple virtual ports of the virtual machine form a port group. The host uses the received VLAN identifier as a VLAN identifier of the port group.

Step S414: The cloud management platform queries, according to the management network IP address of the host, the management network IP address of the network processing device associated with the host, obtains the network address of the virtual port of the virtual machine by means of parsing according to the reported virtual machine change event, and allocates VPC network information to the virtual machine.

The cloud management platform stores the correspondence between the management network IP address of the host and the management network IP address of the network processing device. The cloud management platform finds the management network IP address of the associated network processing device according to the received management network IP address of the host. The cloud management platform obtains the network address of the virtual port of the virtual machine by parsing according to the reported virtual machine change event. The cloud management platform allocates the VPC network information to the virtual machine, and establishes an association relationship between the network address of the virtual port of the virtual machine and the VPC network information. The VPC network information includes but is not limited to one or more of a DHCP rule, a port security rule, an L2 forwarding rule, an L3 routing rule, or a tunnel encapsulation rule.

Step S415: The cloud management platform delivers the VPC network information to the network processing device.

Step S416: The network processing device performs related network configuration according to the received VPC network information.

An operating system is installed on the network processing device. When the network processing device receives the VPC network information sent by the cloud management platform, the operating system of the network processing device creates a corresponding virtual network element such as a LINUX bridge, an open vswitch, or a NAMESPACE according to the VPC network information, and creates a corresponding virtual port for the virtual network element. It should be noted that different virtual machines may have different network feature requirements. The network processing device may further store a mapping relationship between a network address of a virtual machine and allocated VPC network information.

Step S417: The cloud management platform notifies a network processing device within a management range of online information of the virtual port.

The cloud management platform may notify the network processing device within the management range of the online information of the virtual port of the virtual machine created in step S409. The management range may be one or more cloud resource pools managed by the cloud management platform. The online information carries the network address of the virtual machine, the identifier (i.e., UUID) of the virtual port of the virtual machine, and the service network IP address of the network processing device. The network processing device that receives the online information may store the online information according to a requirement.

When receiving the online information of the virtual port, the network processing device within the management range of the cloud management platform may store a correspondence between the network address of the virtual machine, the identifier (i.e., UUID) of the virtual port of the virtual machine, and the service network IP address of the network processing device on which the virtual machine is located.

Step S418: The host receives, using the virtual port, a data packet sent by the virtual machine.

The host receives the data packet from the virtual port of the virtual machine. The data packet carries a VLAN identifier of a VLAN on which the virtual port of the virtual machine is located, a source network address, and a destination network address.

Step S419: The host redirects the data packet to the network processing device.

The data packet sent by the virtual machine carries the VLAN identifier. Virtual ports of virtual machines on the host have different VLAN identifiers, and are isolated from each other. When the virtual switch on the host receives the data packet, the virtual switch broadcasts the data packet according to the VLAN identifier. The data packet is diverted to the network processing device using the uplink port.

When the network processing device and the host are connected in the virtual port manner, the network processing device is a physical network interface card for the host, the virtual machine sends the data packet from the corresponding virtual port, and the virtual switch receives the data packet and sends the data packet to the network processing device by means of broadcasting.

When the network processing device and the host are connected in the back-to-back connection manner, the virtual machine sends the data packet from the corresponding virtual port, the virtual switch sends the data packet to a physical network interface card by broadcasting, and the physical network interface card forwards the data packet to the network processing device.

When the network processing device and the host are connected in the back-to-back relaying manner, the virtual machine sends the data packet from the corresponding virtual port, the virtual switch sends the data packet to a physical network interface card by broadcasting, and the physical network interface card forwards the data packet to the network processing device by relaying performed by a switching device.

Step S420: The network processing device receives the data packet, and processes the data packet according to the VPC network information corresponding to the virtual machine.

The network processing device receives the data packet, peels off the VLAN identifier carried in the data packet, and obtains the source network address and the destination network address that are carried in the data packet. The network processing device determines the source network address and the VPC network information that is associated with a source virtual machine of the data packet, and processes the data packet according to the determined VPC network information. Further, the data packet may be processed by the virtual network element (for example, a LINUX bridge, a NAMESPACE, or an Open vSwitch) of the network processing device to implement VPC network features such as a security group, port security, L2 forwarding, distributed routing, DHCP, network address translation (NAT), policy-based routing, and virtual extensible local area network (Vxlan) tunnel or generic routing encapsulation (GRE) tunnel encapsulation. The network processing device determines the associated virtual network element according to the source network address of the data packet, and the associated virtual network element performs network function processing on the data packet.

When a destination virtual machine of the data packet and the source virtual machine that sends the data packet are located on a same host, the network processing device returns the processed data packet to the host. When a destination virtual machine and the source virtual machine that sends the data packet are located on different hosts in a same cloud resource pool, the network processing device sends the processed data packet to the destination virtual machine using a local switch. When a destination virtual machine and the virtual machine that sends the data packet are located on hosts in different cloud resource pools, the network processing device performs tunnel encapsulation on the data packet, and then sends the encapsulated data packet to the destination virtual machine using a public network.

It should be noted that the cloud resource pool in this embodiment may be a HYPER-V cloud resource pool, a VMWARE cloud resource pool, a XEN cloud resource pool, or a KVM cloud resource pool. When the cloud resource pool is a VMWARE cloud resource pool, a VCENTER server is further deployed in the VMWARE cloud resource pool. In this way, some functions of the host need to be offloaded onto the VCENTER server for execution. The VCENTER server is mainly configured to manage all operations such as creating, canceling, configuring, migrating, and backing up a virtual machine deployed on the host in the VMWare cloud resource pool, add the host to the management network and the service network, allocate the management network IP address and the service network IP address to the host, and allocate the management network IP address and the service network IP address to the network processing device, and report the correspondence between the management network IP address of the host and the management network IP address of the network processing device to the cloud management platform. The VCENTER server determines a distribution status of hardware resources on hosts in the cloud resource pool, selects a host that matches the resource configuration information, and creates a virtual machine on the host according to the resource configuration information. After the virtual machine is successfully created, the host creates a virtual port of the virtual machine according to a network address.

When computing instances in two cloud resource pools of different types communicate with each other, the two cloud resource pools may provide different VPC network features. To implement interworking and interconnection of traffic of computing instances in different cloud resource pools, a dedicated virtual processing network element is usually created on a host in other approaches. The host diverts the traffic of the computing instances to the dedicated virtual processing network element for network feature processing in order to implement different VPC network features. A VMWARE cloud resource pool is used as an example. Each ESXi host creates and starts a dedicated virtual machine. A VDS/VSS diverts traffic of another virtual machine on the ESXi host to a dedicated virtual processing network element for packet processing in order to provide a VPC network feature such as DHCP, NAT, or Vxlan encapsulation. However, in the foregoing implementation, a hardware resource of the host is consumed in creating and starting the virtual processing network element, and the virtual processing network element encounters performance bottleneck, causing high optimization costs. Traffic of virtual machines on a same host is isolated, and consequently, some VPC network features (for example, a security group) cannot take effect.

An embodiment provides a cloud computing system to implement interworking between cloud resources of different types. Referring to FIG. 1, a structure and a working process of the cloud computing system in this embodiment are described. In this embodiment, a first computing instance and a second computing instance are located on different hosts. It is assumed that a host 111 is a first server, the first computing instance is deployed on the first server, and the host 111 is associated with a network processing device 1111, and that a host 1m1 is a second server, the second computing instance is deployed on the second server, and the host 1m1 is associated with a network processing device 1m11. The working process of the cloud computing system provided in this application includes that the first computing instance on the first server generates a data packet, where the data packet carries a source network address and a destination network address, the source network address is a network address of the first computing instance, the destination network address is a network address of the second computing instance, both the source network address and the destination network address may be an IP address and/or a MAC address, and the IP address is a service network IP address. The first server and the second server may be located in different cloud resource pools, the first server is connected to the network processing device 1111 (i.e., a first network processing device), and the second server is connected to the network processing device 1m11 (i.e., a second network processing device). The first server pre-stores VLAN configuration information, and the VLAN configuration information indicates that a virtual port of each computing instance deployed on the first server has a different VLAN identifier. The first server redirects the data packet to the associated first network processing device according to the preset VLAN configuration information. The first network processing device receives the data packet, obtains the source network address carried in the data packet, and queries, according to a preset mapping relationship, first VPC network information associated with the source network address. The first VPC network information is VPC network information preconfigured for the first computing instance. The first network processing device performs related processing on the data packet according to the first VPC network information. The first VPC network information includes but is not limited to one or more of a DHCP rule, a port security rule, an L2 forwarding rule, an L3 routing rule, or a tunnel encapsulation rule. When the first network processing device determines, according to the destination network address (for example, a destination IP address and a destination MAC address) carried in the data packet, that the first computing instance and the second computing instances are located on different hosts, the first network processing device sends the processed data packet to a switching device. According to the destination network address carried in the data packet, the switching device performs L2 forwarding or L3 routing to transmit the data packet to the second network processing device. The second network processing device queries, according to a preset mapping relationship, second VPC network information associated with the destination network address. The second VPC network information is VPC network information preconfigured for the second computing instance. The second network processing device processes the received data packet according to the second VPC network information, and then sends the processed data packet to the second server. The second server sends the data packet to the second computing instance using a virtual port corresponding to the second computing instance.

The second computing instance generates a response data packet according to the data packet. The response data packet carries a source network address and a destination network address, the source network address is the network address of the second computing instance, and the destination network address is the network address of the first computing instance. For a process in which the second computing instance returns the response data packet to the first computing instance, refer to the process in which the first computing instance sends the data packet to the second computing instance. Details are not described herein.

In the foregoing embodiments, a data packet between any two computing instances needs to be diverted to a network processing device, and the network processing device performs VPC network feature processing according to VPC network information. In this way, complete VPC network features may be provided for different types of cloud resource pools, the network processing device does not need to occupy a hardware resource of a host, and utilization of a hardware resource pool in a cloud resource pool is improved.

Figure 5A:
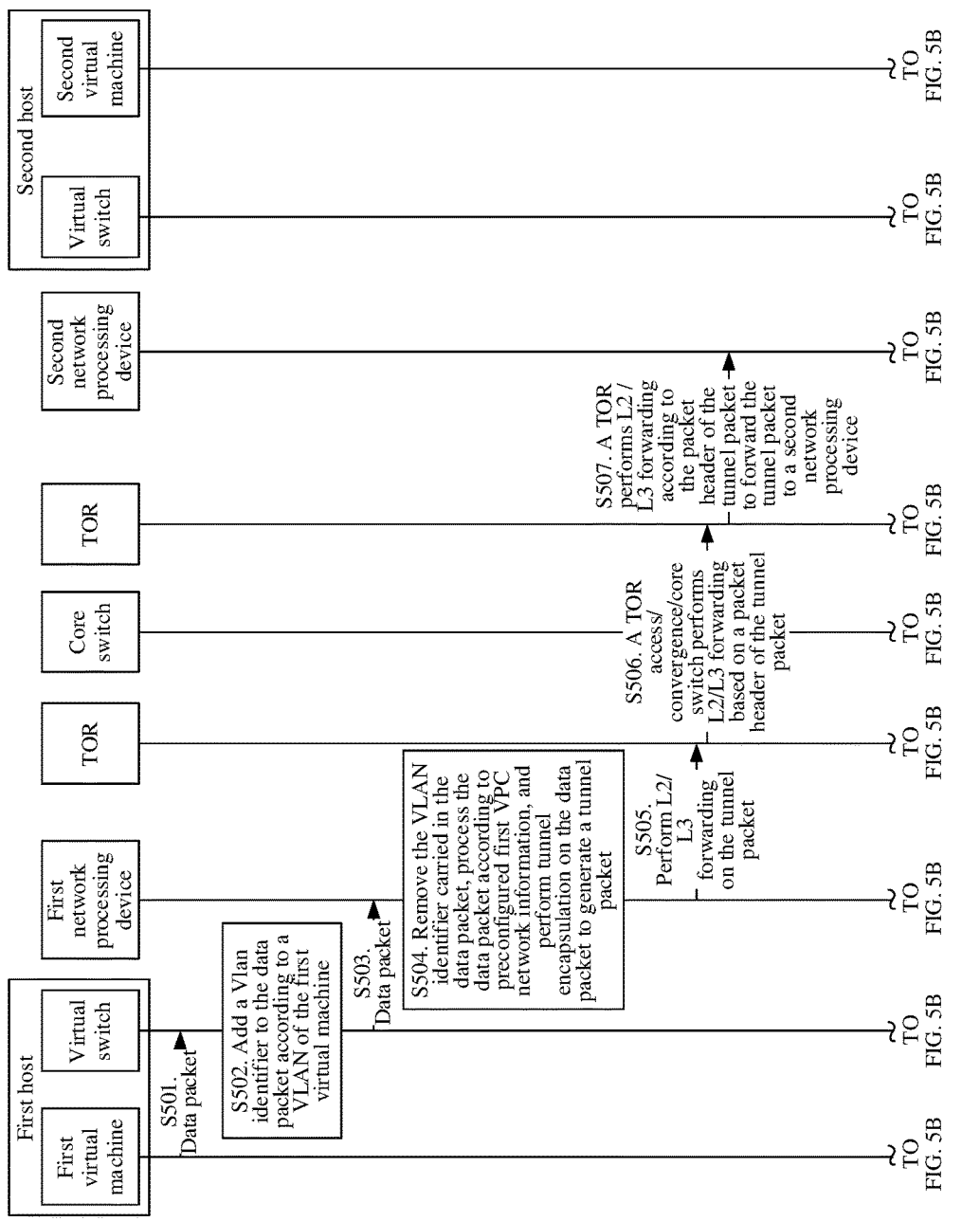
FIG. 5A and FIG. 5B are another schematic flowchart of a data packet processing method according to an embodiment of the present disclosure.
Figure 5B:
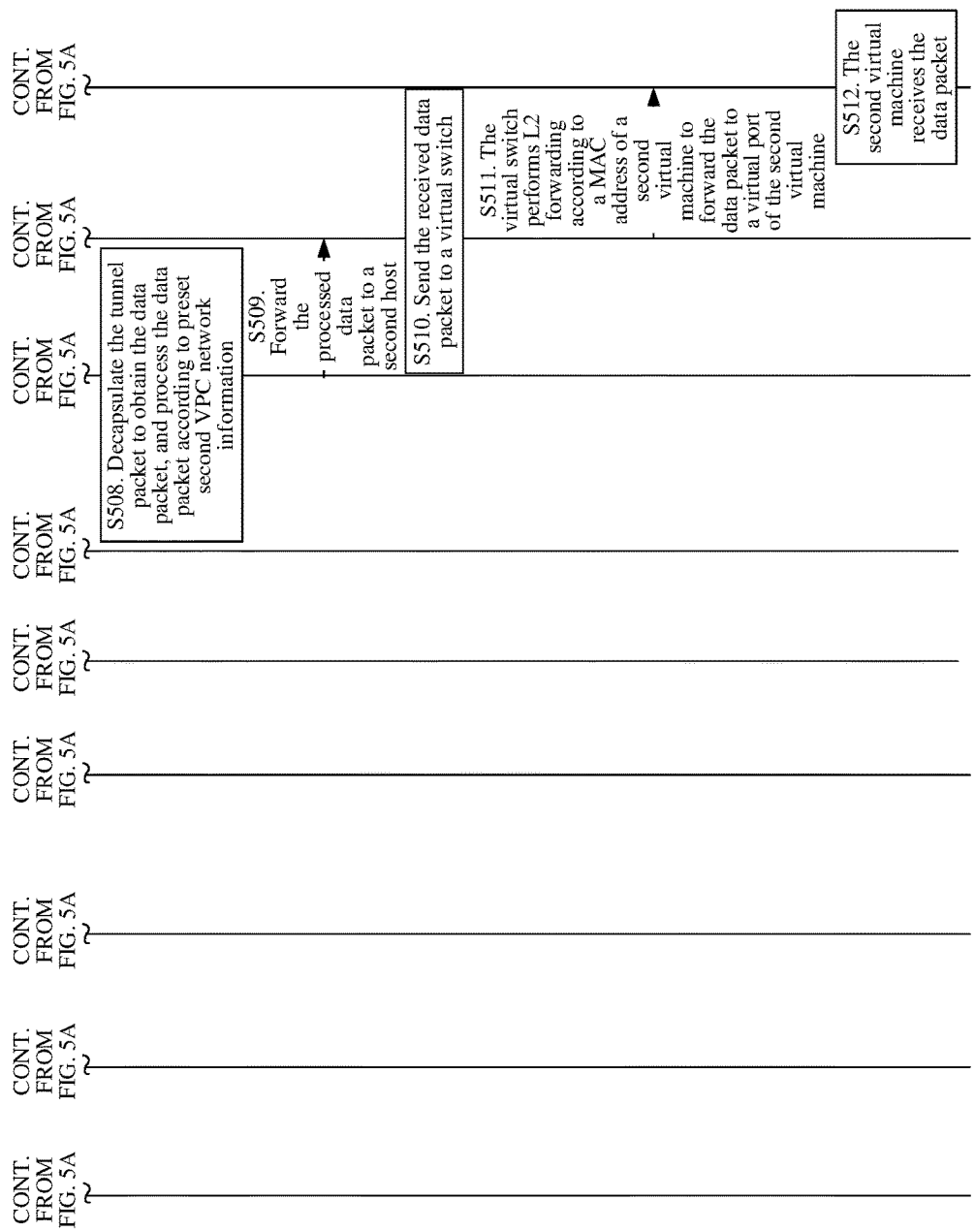

Further, referring to FIG. 5A and FIG. 5B, FIG. 5A and FIG. 5B are a schematic flowchart of a data packet processing method according to an embodiment of the present disclosure. In this embodiment of the present disclosure, a first virtual machine is deployed on a first host, and the first host is connected to a first network processing device in a diversion mode. A second virtual machine is deployed on a second host, the second host is connected to a second network processing device in a diversion mode, and a virtual switch is further deployed in the first host and the second host to route and forward packets of the virtual machines. For a specific connection manner, refer to the descriptions of FIG. 3A to FIG. 3C. The data packet processing method in this embodiment is described below using a process of communication between the first virtual machine and the second virtual machine as an example, and includes the following steps:

Step S501: The first virtual machine sends a data packet to a virtual switch.

The first virtual machine sends the data packet to the virtual switch using a virtual port. The data packet carries an IP address (a source IP address) of the first virtual machine, a MAC address (a source MAC address) of the first virtual machine, an IP address (a destination IP address) of the second virtual machine, and a MAC address (a destination MAC address) of the second virtual machine. Both the source IP address and the destination IP address are service network IP addresses.

Step S502: The virtual switch adds a VLAN identifier to the data packet according to a VLAN of the first virtual machine.

The virtual switch determines, according to a virtual port that receives the data packet, the VLAN to which the first virtual machine belongs, and adds the VLAN identifier of the VLAN to the data packet.

Step S503: The virtual switch sends the data packet to the first network processing device.

VLAN identifiers of virtual ports of all virtual machines on the first host are preset to be different from each other. Therefore, all the virtual machines on the first host are isolated from each other.

When the first network processing device and the first host are connected in a virtual port manner, the first network processing device is a physical network interface card for the first host. The first virtual machine sends the data packet using a corresponding virtual port, and the virtual switch on the first host receives the data packet and sends the data packet to the first network processing device by means of broadcasting.

When the first network processing device and the first host are connected in a back-to-back connection manner, the first virtual machine sends the data packet using a corresponding virtual port. The virtual switch on the first host sends the data packet to a physical network interface card by means of broadcasting, and the physical network interface card forwards the data packet to the first network processing device.

When the first network processing device and the first host are connected in a back-to-back relaying manner, the first virtual machine sends the data packet using a corresponding virtual port. The virtual switch on the first host sends the data packet to a physical network interface card by means of broadcasting, and the physical network interface card forwards the data packet to the first network processing device by means of relaying performed by a top of rack (TOR).

Step S504: The first network processing device removes the VLAN identifier carried in the data packet, processes the data packet according to preconfigured first VPC network information. The first network processing device determines whether a to-be-accessed virtual machine is located on a same host. If the to-be-accessed virtual machine is not located on a same host, the first network processing device performs tunnel encapsulation on the data packet.

The first network processing device receives, using a service network port, the data packet that carries the VLAN identifier, peels off the VLAN identifier in the data packet, obtains the source network address (the IP address and/or the MAC address of the first virtual machine) carried in the data packet, and queries, according to a preset mapping relationship, the first VPC network information associated with the source network address. The first network processing device processes the data packet according to the preconfigured first VPC network information. The first network processing device performs tunnel encapsulation on the processed data packet to generate a tunnel packet.

Step S505: The first network processing device performs L2/L3 forwarding to forward a tunnel packet to a TOR adjacent to the first host.

Step S506: A TOR access/convergence/core switch performs L2/L3 forwarding based on a packet header of the tunnel packet.

Step S507: The TOR performs L2/L3 forwarding according to the packet header of the tunnel packet to forward the tunnel packet to the second network processing device.

Step S508: The second network processing device decapsulates the tunnel packet to obtain the data packet, and processes the data packet according to the preset second VPC network information.

The second network processing device obtains the destination network address (the IP address and/or the MAC address of the second virtual machine) carried in the data packet, queries, according to a preset mapping relationship, the second VPC network information associated with the destination network address, and processes the data packet according to the second VPC network information.

Step S509: The second network processing device forwards the processed data packet to the second host.

Step S510: The second host sends the received data packet to a virtual switch.

Step S511: The virtual switch performs L2 forwarding according to a MAC address of the second virtual machine to forward the data packet to a virtual port of the second virtual machine.

Step S512: The second virtual machine receives the data packet.

It should be noted that the second virtual machine generates a response data packet according to the data packet. For a process in which the second virtual machine returns the response data packet to the first virtual machine, refer to the descriptions of steps S501 to S512. Details are not described herein.

The embodiment shown in FIG. 5A and FIG. 5B discloses a process of transmitting a data packet between two virtual machines. In the foregoing process, VPC network feature processing of a data packet is performed by a network processing device, and the network processing device ensures irrelevancy between a VPC network feature and a cloud resource pool type.

Figure 6:
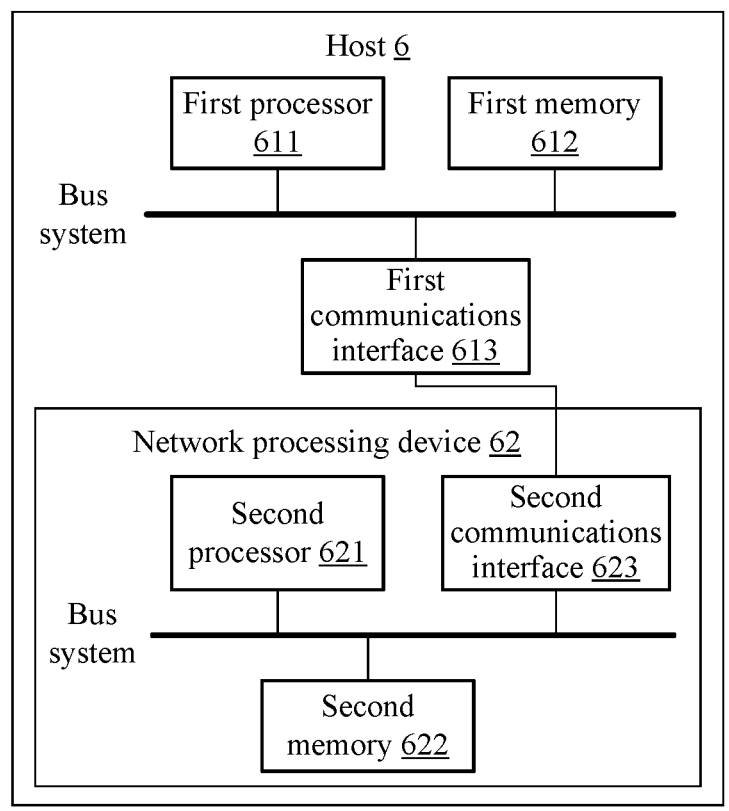
FIG. 6 is a schematic structural diagram of hardware of a host according to an embodiment of the present disclosure.

Referring to FIG. 6, FIG. 6 is a schematic diagram of a hardware structure of a host 6 according to an embodiment of the present disclosure. The host 6 shown in FIG. 6 includes a first processor 611, a first memory 612, a first communications interface 613, and a network processing device 62. The network processing device 62 includes a second processor 621, a second memory 622, and a second communications interface 623. The first communications interface 613 and the second communications interface 623 are configured to transmit service data and a control command. The first communications interface 613 and the second communications interface 623 are of a same interface type. The first communications interface 613 and the second communications interface 623 may be any one of a PCI interface, a USB interface, or a SATA interface. There may be one or more first processors 611 and second processors 621. The first processor 611 and the second processor 621 may be single-core processors or multi-core processors. In some embodiments of the present disclosure, the first processor 611, the first memory 612, and the first communications interface 613 may be connected using a bus system or in another manner, and the second processor 621, the second memory 622, and the second communications interface 623 may be connected using a bus system or in another manner.

Multiple computing instances run on the host 6. VLAN identifiers are configured for virtual ports of the multiple computing instances, and the VLAN identifiers of the virtual ports of the computing instances are different from each other. The first memory 612 and the second memory 622 store instructions. The first processor 611 executes an instruction in the first memory 612 to implement a function of a computing instance running on the host 6. The first processor 611 executes an instruction in the first memory 612 to implement a function of a virtual switch running on the host 6. The second processor 621 is configured to execute an instruction in the second memory 622 to implement network function processing on a data packet sent by the computing instance.

The second processor 621 is configured to execute an instruction in the second memory 622 to perform the step of receiving VPC network information that is of the computing instance running on the host 6 and that is sent by a cloud management platform.

The first processor 611 is configured to execute an instruction in the first memory 612 to perform the step of sending a data packet using a virtual port of the first processor 611, where the data packet carries a network address of the computing instance and a VLAN identifier of the virtual port that sends the data packet.

The first processor 611 is configured to execute an instruction in the first memory 612 to perform the step of sending the data packet according to the VLAN identifier, and routing the data packet to the network processing device.

The second processor 621 is configured to execute an instruction in the second memory 622 to perform the steps of receiving the data packet, determining the VPC network information of the computing instance according to the network address of the computing instance, performing network function processing on the data packet, and sending the data packet.

In a possible implementation, the second processor 621 is configured to execute an instruction in the second memory 622 to perform the step of receiving online information sent by the cloud management platform, where the online information includes a service network IP address of another network processing device and a network address of a computing instance corresponding to the other network processing device.

In a possible implementation, the second processor 621 is configured to execute an instruction in the second memory 622 to perform the steps of determining, according to a destination network address of the data packet, a service network IP address of a network processing device corresponding to a destination computing instance of the data packet, establishing a tunnel between the network processing device and the network processing device corresponding to the destination computing instance of the data packet, and sending the data packet using the established tunnel.

In a possible implementation, the second processor 621 is configured to execute an instruction in the second memory 622 to perform the step of creating, according to the received VPC network information, a virtual network element that provides a network processing function for the computing instance.

That the second processor 621 is configured to execute an instruction in the second memory 622 to determine the VPC network information of the computing instance according to the network address of the computing instance, and perform network function processing on the data packet includes determining, according to a source network address of the data packet, the virtual network element corresponding to the computing instance such that the determined virtual network element provides the network processing function for the computing instance.

In summary, the host diverts the data packet of the computing instance to the network processing device, and the network processing device performs corresponding processing on the data packet according to the preconfigured VPC network information. The network processing device implements complete VPC network feature processing, and may add or remove a VPC network feature of the computing instance according to a requirement in order to facilitate VPC network feature management of the computing instance and reduce costs of deploying a cloud resource pool.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a read-only memory (ROM), a random access memory (RAM), a magnetic disk, or an optical disc.

What is disclosed above is merely example embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A cloud computing system, comprising:
    at least one host; and
    a cloud management platform coupled to the at least one host and configured to send virtual private cloud (VPC) network information of a computing instance running on the at least one host to a network processing device according to a correspondence between a management network Internet Protocol (IP) address of the at least one host and a management network IP address of the network processing device,
    wherein the at least one host comprises:
        a virtual switch; and
        the network processing device coupled to the virtual switch,
    wherein a plurality of computing instances runs on the at least one host,
    wherein virtual local area network (VLAN) identifiers are configured for virtual ports of the plurality of computing instances,
    wherein the VLAN identifiers of the virtual ports of the plurality of computing instances are different from each other,
    wherein the at least one host communicates with another device in the cloud computing system using the network processing device,
    wherein the virtual switch is configured to:
        receive a data packet from the computing instance using a virtual port of the computing instance, wherein the data packet carries a network address of the computing instance and a VLAN identifier of the virtual port sending the data packet;
        send the data packet according to the VLAN identifier; and
        route the data packet to the network processing device, and
    wherein the network processing device is configured to:
        receive the data packet;
        determine the VPC network information of the computing instance according to the network address of the computing instance;
        perform network function processing on the data packet; and
        send the data packet.

2. The system according to claim 1, wherein the network processing device is further configured to receive online information from the cloud management platform, and wherein the online information comprises a service network IP address of another network processing device and a network address of a computing instance running on a host coupled to the other network processing device.

3. The system according to claim 2, wherein the network processing device is further configured to:
    determine, according to a destination network address of the data packet, a service network IP address of a network processing device corresponding to a destination computing instance of the data packet;
    establish a tunnel between the network processing device and the network processing device corresponding to the destination computing instance of the data packet; and
    send the data packet using the established tunnel.

4. The system according to claim 2, wherein the cloud management platform is further configured to:
    allocate the management network IP address of the network processing device and a service network IP address to the network processing device; and
    record the correspondence between the management network IP address of the at least one host and the management network IP address of the network processing device.

5. The system according to claim 2, wherein the cloud management platform is further configured to send an instance creation request to the at least one host, wherein the instance creation request carries resource configuration information and the network address of the computing instance, and wherein the at least one host is further configured to:

create the computing instance and the virtual port of the computing instance according to the resource configuration information and the network address of the computing instance; and return, to the cloud management platform, an indication message indicating that the computing instance is successfully created, wherein the indication message carries the management network IP address of the at least one host and the network address of the computing instance, wherein the cloud management platform is further configured to allocate the VLAN identifier to the virtual port of the created computing instance, and wherein the allocated VLAN identifier is different from a VLAN identifier of any existing virtual port on the at least one host.

6. The system according to claim 2, wherein the network processing device is further configured to:

create, according to the received VPC network information, a virtual network element that provides a network processing function for the computing instance; and determine, according to a source network address of the data packet, the virtual network element corresponding to the computing instance.

7. A data packet processing method, wherein the data packet processing method is applied to a cloud computing system comprising a cloud management platform and at least one host, and wherein the data packet processing method comprises:

sending, by the cloud management platform, virtual private cloud (VPC) network information of a computing instance running on the at least one host to a network processing device according to a correspondence between a management network Internet Protocol (IP) address of the at least one host and a management network IP address of the network processing device, wherein the at least one host comprises a virtual switch and the network processing device, wherein a plurality of computing instances runs on the at least one host, wherein virtual local area network (VLAN) identifiers are configured for virtual ports of the plurality of computing instances, wherein the VLAN identifiers of the virtual ports of the plurality of computing instances are different from each other, and wherein the at least one host communicates with another device in the cloud computing system using the network processing device;

receiving, by the virtual switch, a data packet from the computing instance using a virtual port of the computing instance, wherein the data packet carries a network address of the computing instance and a VLAN identifier of the virtual port sending the data packet;

sending, by the virtual switch, the data packet according to the VLAN identifier;

routing, by the virtual switch, the data packet to the network processing device;

receiving, by the network processing device, the data packet;

determining, by the network processing device, the VPC network information of the computing instance according to the network address of the computing instance;

performing, by the network processing device, network function processing on the data packet; and sending, by the network processing device, the data packet.

8. The method according to claim 7, wherein before receiving the data packet, the method further comprises receiving, by the network processing device, online information from the cloud management platform, and wherein the online information comprises a service network IP address of another network processing device and a network address of a computing instance running on a host coupled to the other network processing device.

9. The method according to claim 8, wherein sending the data packet comprises:

determining, by the network processing device according to a destination network address of the data packet, a service network IP address of a network processing device corresponding to a destination computing instance of the data packet;

establishing, by the network processing device, a tunnel between the network processing device and the network processing device corresponding to the destination computing instance of the data packet; and sending, by the network processing device, the data packet using the established tunnel.

10. The method according to claim 8, wherein before sending the VPC network information, the method further comprises:

allocating, by the cloud management platform, the management network IP address of the network processing device and a service network IP address to the network processing device; and recording, by the cloud management platform, the correspondence between the management network IP address of the host and the management network IP address of the network processing device.

11. The method according to claim 8, wherein before sending the VPC network information, the method further comprises:

sending, by the cloud management platform, an instance creation request to the at least one host, wherein the instance creation request carries resource configuration information and the network address of the computing instance;

creating, by the at least one host, the computing instance and the virtual port of the computing instance according to the resource configuration information and the network address of the computing instance;

returning, by the at least one host to the cloud management platform, an indication message indicating that the computing instance is successfully created, wherein the indication message carries the management network IP address of the at least one host and the network address of the computing instance; and allocating, by the cloud management platform, the VLAN identifier to the virtual port of the created computing instance, wherein the allocated VLAN identifier is different from a VLAN identifier of any existing virtual port on the at least one host.

12. The method according to claim 8, wherein after sending the VPC network information, the method further comprises creating, by the network processing device according to the received VPC network information, a virtual network element that provides a network processing function for the computing instance, and wherein determining the VPC network information, and performing the network function processing on the data packet comprises determining, by the network processing device according to a source network address of the data packet, the virtual network element corresponding to the computing instance.

13. A data packet processing method, wherein the data packet processing method is applied to a host, and wherein the method comprises:
   receiving, by a network processing device, virtual private cloud (VPC) network information of a computing instance running on the host from a cloud management platform, wherein the host comprises a virtual switch and the network processing device, wherein a plurality of computing instances run on the host, wherein virtual local area network (VLAN) identifiers are configured for virtual ports of the plurality of computing instances, wherein the VLAN identifiers of the virtual ports of the plurality of computing instances are different from each other, and wherein the host communicates with another device in a cloud computing system using the network processing device;
   sending, by the computing instance, a data packet using a virtual port of the computing instance, wherein the data packet carries a network address of the computing instance and a VLAN identifier of the virtual port sending the data packet;
   sending, by the virtual switch, the data packet according to the VLAN identifier;
   routing, by the virtual switch, the data packet to the network processing device;
   receiving, by the network processing device, the data packet;
   determining, by the network processing device, the VPC network information of the computing instance according to the network address of the computing instance;
   performing, by the network processing device, network function processing on the data packet; and
   sending, by the network processing device, the data packet.

14. The method according to claim 13, wherein before receiving the data packet, the method further comprises receiving, by the network processing device, online information from the cloud management platform, and wherein the online information comprises a service network Internet Protocol (IP) address of another network processing device and a network address of a computing instance running on a host coupled to the other network processing device.

15. The method according to claim 14, wherein sending the data packet comprises:
   determining, by the network processing device according to a destination network address of the data packet, a service network IP address of a network processing device corresponding to a destination computing instance of the data packet;
   establishing, by the network processing device, a tunnel between the network processing device and the network processing device corresponding to the destination computing instance of the data packet; and
   sending, by the network processing device, the data packet using the established tunnel.

16. The method according to claim 13, wherein after receiving the VPC network information, the method further comprises creating, by the network processing device according to the received VPC network information, a virtual network element that provides a network processing function for the computing instance, and wherein determining the VPC network information of the computing instance and performing the network function processing on the data packet comprises determining, by the network processing device according to a source network address of the data packet, the virtual network element corresponding to the computing instance such that the determined virtual network element provides the network processing function for the computing instance.

17. A host, comprising:
   a first processor,
   a first memory coupled to the first processor, and
   a network processing device coupled to the first processor and the first memory, wherein the network processing device comprises:
      a second processor; and
      a second memory coupled to the second processor,
   wherein a plurality of computing instances run on the host,
   wherein virtual local area network (VLAN) identifiers are configured for virtual ports of the plurality of computing instances,
   wherein the VLAN identifiers of the virtual ports of the plurality of computing instances are different from each other,
   wherein the first memory and the second memory are configured to store instructions,
   wherein the first processor is configured to:
      execute a first instruction in the first memory to implement a function of a computing instance running on the host; and
      execute a second instruction in the first memory to implement a function of a virtual switch running on the host,
   wherein an instruction in the second memory causes the second processor to be configured to receive virtual private cloud (VPC) network information of the computing instance running on the host from a cloud management platform,
   wherein the first instruction in the first memory causes the first processor to be configured to send a data packet using a virtual port of the first processor, wherein the data packet carries a network address of the computing instance and a VLAN identifier of the virtual port sending the data packet,
   wherein the second instruction in the first memory causes the first processor to be configured to:
      send the data packet according to the VLAN identifier; and
      route the data packet to the network processing device, and
   wherein the instruction in the second memory further causes the second processor to be configured to:
      receive the data packet;
      determine the VPC network information of the computing instance according to the network address of the computing instance;
      perform network function processing on the data packet; and
      send the data packet.

* * * * *